(12) United States Patent
Hanft et al.

(10) Patent No.: US 10,122,312 B2
(45) Date of Patent: Nov. 6, 2018

(54) CONTROL OF A ROTATING FIELD MACHINE

(71) Applicant: ZF Friedrichshafen AG, Friedrichshafen (DE)

(72) Inventors: Hans-Jürgen Hanft, Pegnitz (DE); Erich Karg, Zeitlofs (DE); Alfred Tareilus, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 102 days.

(21) Appl. No.: 15/001,930

(22) Filed: Jan. 20, 2016

(65) Prior Publication Data

US 2016/0211789 A1    Jul. 21, 2016

(30) Foreign Application Priority Data

Jan. 20, 2015   (DE) .................. 10 2015 200 742

(51) Int. Cl.
   *H02P 25/22*   (2006.01)
   *H02K 11/27*   (2016.01)

(52) U.S. Cl.
   CPC .............. *H02P 25/22* (2013.01); *H02K 11/27* (2016.01); *H02P 2207/01* (2013.01)

(58) Field of Classification Search
   CPC ...... H02P 25/22; H02P 2207/01; H02K 11/27
   USPC .......................................................... 318/806
   See application file for complete search history.

(56) References Cited

U.S. PATENT DOCUMENTS

| 2007/0132424 A1* | 6/2007 | Takao | ...................... H02P 21/14 318/806 |
| 2007/0152676 A1* | 7/2007 | Lee | ...................... H02P 23/0004 324/522 |
| 2009/0206662 A1* | 8/2009 | Kakuda | .................. B60K 6/365 307/11 |
| 2013/0241452 A1* | 9/2013 | Suzuki | ................. B62D 5/0403 318/400.15 |
| 2014/0132197 A1* | 5/2014 | Kanazawa | ............... H02K 3/28 318/724 |
| 2014/0207335 A1* | 7/2014 | Mikamo | ............... B62D 5/046 701/41 |

FOREIGN PATENT DOCUMENTS

| DE | 10 2011 052 920 A1 | 3/2012 |
| DE | 10 2012 207 534 A1 | 11/2013 |
| DE | 10 2013 222 567 A1 | 5/2014 |
| DE | 10 2013 200 672 A1 | 6/2014 |

OTHER PUBLICATIONS

Search Report dated May 13, 2015 for German Patent Application No. 10 2015 200 742.1, (10 pp.), note: pp. 1 and 2 are English language Explanations to Section C. Result of Determination Document.

\* cited by examiner

*Primary Examiner* — Kawing Chan

(74) *Attorney, Agent, or Firm* — Brinks Gilson & Lione

(57) ABSTRACT

The current embodiments provide a method for controlling an induction machine with a plurality of phases. Each phase may include a plurality of parallel windings and each phase may be associated with a half-bridge. The method may include determining a current in a winding of a first phase. The method may further include determining a phase current on the basis of the current in the winding, and controlling the half-bridge associated with the first phase based on the determined phase current.

20 Claims, 2 Drawing Sheets

CONTROL OF A ROTATING FIELD MACHINE

CROSS-REFERENCE TO RELATED APPLICATIONS

This current application claims the priority of German Patent Application DE 10 2015 200 742.1, filed on Jan. 20, 2015, which is incorporated by reference herein in its entirety.

BACKGROUND

The current embodiments relate to the control system for an induction machine. The current embodiments relate in particular to a feedback control system for an induction machine.

An induction machine can be used alternatively as a motor or a generator. In a drive train of a motor vehicle, an induction machine can be used depending on the needs e.g. for driving or for recovery of electric energy when the motor vehicle is braking. In another embodiment, the induction machine as an integrated starter generator can be alternatively used to start a combustion engine or to transform mechanical energy from the drivetrain into electrical energy, e.g. for the electrical system of the motor vehicle. The induction machine can particularly consist of an electrically excited or permanently excited synchronous machine, a reluctance machine, an asynchronous machine or a combination of these machine types.

The induction machine consists of a number of phases P, which are usually connected in a delta or star-connection. In drive mode, predetermined voltages are produced at the connections of the induction machine, in order to influence rotation speed, rotation direction or torque of the induction machine. The phase currents that are actually flowing through the phases usually have to be measured and supplied to a control system in order to determine the voltages that have to be adjusted. A measuring of big electrical currents, such as e.g. in the above mentioned starter generator, can be time-consuming and error-prone. It is for example possible to insert a series resistor (shunt) in a supply line of one phase, at which a voltage drop can be measured that is proportional to the phase current. However, a series resistor may heat up during operation, whereby the converted electrical power quadruples in proportional to the electrical current flowing through it. The electrical power that is to be supplied to the induction machine may hereby be reduced, or problems may arise in connection with heat dissipation.

DETAILED DESCRIPTION

Figure 1:
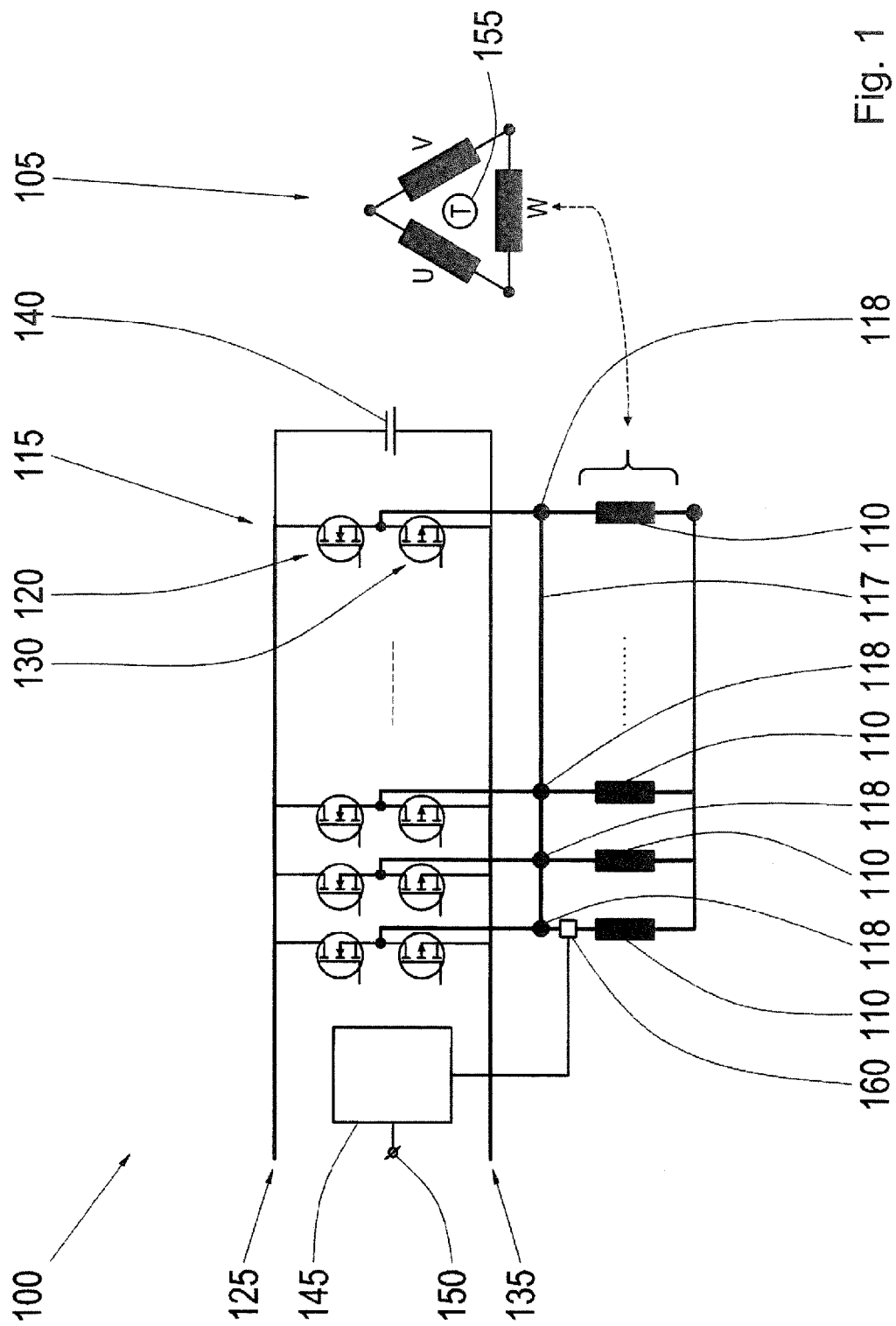
FIG. 1 is a circuit diagram of a portion of a control device for controlling an induction machine.

It is the objective of the present embodiments is to provide a technology in order to improve a control system for an induction machine. The present embodiments achieve this objective by means of a method and a device with the characteristics of the independent claims. Sub-claims are reflected in preferred embodiments.

An induction machine consists of several phases, whereby each phase consists of several parallel windings. A method for controlling the induction machine includes steps to determine a current in a winding that flows through one of the windings of one of the phases, to determine a current in a phase based on the current in that winding and to control half-bridges that are associated to each respective phase, depending on the particular phase current.

The current in a winding is usually less than the current in the phase, so that the phase current, which has to be measured for controlling purposes, can be determined in a simple manner and with lesser loss. An error in the determination of the phase current can be reduced. Heat loss during the determination of the current in the winding can be smaller than that in the direct determination of the phase current.

In one embodiment, each phase comprises N windings, and the phase current is determined on the basis of the N-fold current of the winding. It is preferred that the N windings are constructed identically. The phase current can be determined on the basis of a simple multiplication of the current in the winding and a constant factor. This determination may only cause a slight load by such a processing device. The achievable accuracy of the determined phase current may be sufficient for determining the voltage that has to be adjusted at the half-bridges.

In another embodiment, the induction machine comprises P phases, and P−1 phase currents are determined on the basis of the respectively associated currents in the windings. The remaining phase current can be determined as the sum of the determined P−1 phase currents. The effort for determining the phase currents can thus be minimized.

A control device for the above-mentioned induction machine comprises one half-bridge for each phase, a processing device for controlling the half-bridges in response to a phase current that is flowing through one of the phases and a current sensor. Hereby, the current sensor is designed to determine a current that is flowing through one of the windings of the phase and the processing device is adapted to determine the phase current on the basis of the current in the winding.

In this way, a feedback control system for controlling an induction machine can be provided in a simple manner.

The current sensor may include a series resistor that is connected in series with the winding. The voltage drop at the series resistor is proportional to the current in the winding, which can be measured e.g. by means of an analog-to-digital converter and then be supplied to the processing device in digital form. The further determination of the phase current and the control system of the half-bridges that is based on it can thus be designed in an easy and efficient way. The electrical power that is converted into heat at the series resistor is usually dependant on the square of the current flowing through the series resistor. Since the current in the winding is less than the phase current, the heat output of the series resistor can be reduced disproportionately.

In another variant, the current sensor comprises a Hall-effect sensor in the region of an electrical line that is connected to the winding. The Hall-effect sensor can scan a magnetic field in the region of the electrical line, which is dependent on the current flowing through the line. Hereby, the Hall-effect sensor can provide a voltage that is proportional to the magnetic field. The further processing of this voltage can be performed in an easy and efficient way, similar to what was described above.

Figure 2:
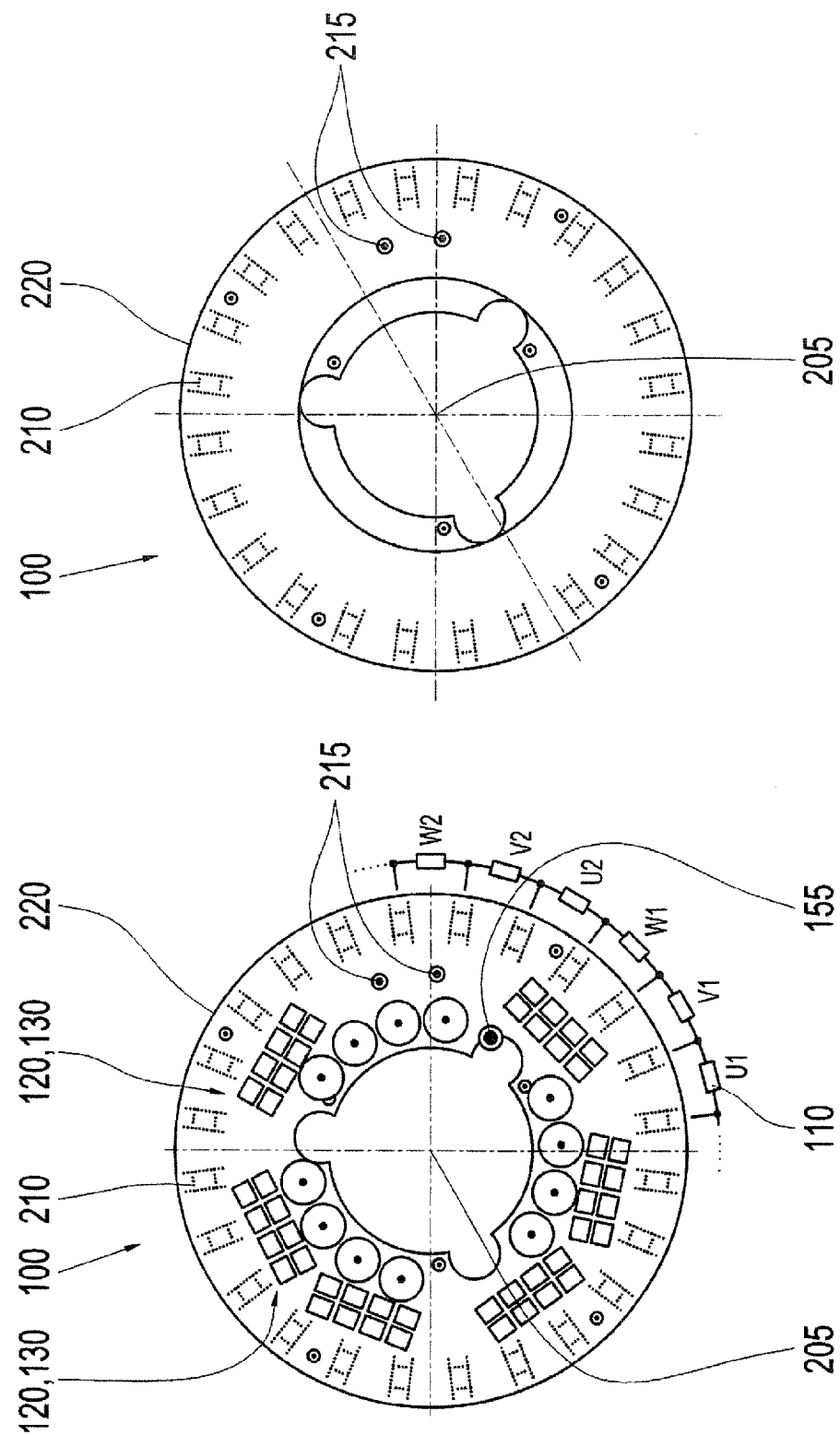
FIG. 2 depictions of various views of an exemplified control system for an induction machine.

The current embodiments will now be described in detail with reference to the attached figures, in which:

FIG. 1 is a circuit diagram of a portion of a control device for controlling an induction machine; and FIG. 2 depictions of various views of an exemplified control system for an induction machine.

FIG. 1 depicts a circuit diagram of part of a control device 100 for controlling an induction machine 105. The induction machine 105 may be used in particular on board of a motor vehicle, e.g. as a generator, starter or in particular as an integrated starter generator. The induction machine 105 generally comprises P phases, whereby for the sake of an example three phases U, V and W are used in this case. Each phase consists of multiple windings 110 that are connected parallel to one another and which are preferably constructed identically. In the depiction of FIG. 1 only the relevant part of the phase W is shown in more detail, the other phases U and V are controlled in a corresponding manner.

In order to supply a predetermined voltage to one connection of the phase W, half-bridge 115 is provided. Half-bridge 115 comprises a first current control valve 120 for connecting the terminal to a high potential 125 and a second current control valve 130 ("Low Side Switch") for connection to a low potential 135. The two potentials 125 and 135 belong to an intermediate circuit, their potential difference is called the intermediate circuit voltage. Typically, an intermediate circuit capacitor 140 is connected close to the current control valves 120 and 130 with the potentials 125 and 135.

In the present embodiment, the current control valves 120, 130 are formed by a respective parallel connection of several power transistors, in particular of field effect transistors. The current control valves 120 and 130 are controlled by a processing device 145, whereby control wires are not depicted in FIG. 1. In dependence of a preset that can be received by the processing device 145 e.g. via an optional interface 150, processing device 145 controls the current control valves 120 and 130 alternately in order to set a predetermined voltage to the terminal of phase W.

Preferably, the processing device 145 performs a space vector modulation or a batch process, to determine the voltages at the terminals of the phases U, V and W. To do this, one or more feedback from the induction machine 105 may be required. For example, a rotation speed or a rotary position may be sampled by means of a tachogenerator 155. Regardless of this, it is necessary to determine at least one phase current flowing through one of the phases U, V, W, and to supply it to processing device 145. To accomplish this, a current sensor 160 is intended, which can be realized in form of a series resistor, a Hall-effect sensor, a fluxgate or in any other known manner.

It is proposed not to directly measure the entire phase current, but rather to calculate it on the basis of a current that flows through one of the windings 110. Preferably, the current sensor 160 is hereby attached to a winding 110 or to a line that is connected to winding 110. The windings 110 are preferably constructed identically, so that the same current flows through each winding 110. With N windings 110, the phase current can be determined with the product of N and the current of the windings.

In the depiction of FIG. 1, several windings 110 and several half-bridges 115 are intended. Hereby it is not necessary that the number of current control valves 120, 130 and that of the windings 110 have to correspond. The number of current control valves 120, 130 can also be O, whereby O can be selected independently from N.

In a variation that is not depicted, the current sensor 160 can also attached to a line that connects a half-bridge 115 with one of the potentials 125 or 135 or with the windings 110, whereby the phase current can be determined as the product of this current and the number O half-bridges 115. It is hereby assumed that the half-bridges 115 are constructed identically.

In both variations it is assumed that the electrical connections between the pairs of the current control valves 120, 130 and the individual windings 110 of the phases U, V and W are adapted to each other, so that particularly identical impedances can be achieved. Effects of the connections on the current flowing through the individual windings 110 or the pairs of current control valves 120, 130 are preferably similar. They thus feature the same sign and same amount.

FIG. 1 depicts a variant, in which the individual half-bridges 115 are connected via a connecting line 117. To accomplish this, each half-bridge 115 has a corresponding contact pin 118. In a modification of this variant, in which the number of half-bridges 115 is equal to the number of windings 110, this connecting line 117 can be omitted.

In FIG. 2 a top side of the control system 100 for controlling the induction machine 105 is depicted in the left pane and a lower side of it in the right pane. Control device 100 is designed in such a way, that it can be installed concentrically to a rotary axis 205 of the induction machine 105. In the depicted embodiment, the following applies exemplarily: N=O=8.

In the depicted embodiment of control device 100, the intermediate circuit capacitors 140 are arranged within a radially inner region, further out there are groups of current control valves 120, 130 of the half-bridges 115 and even further outside contact elements 210 for connecting to windings 110 of phases U, V and W are arranged. The location of the contact elements 210 preferably corresponds to the physical arrangement of the individual windings 110 around rotary axis 205, so that the lines between the contact elements 210 and the windings 110 can be as short as possible and without any crossovers. The connectors 215 for connecting to the potentials 125 and 135 are further intended within a radial middle range. While the depicted elements can also be arranged in a different way, it is preferred to take the radial construction into account, keeping the geometrical arrangement of the individual windings 110 of the phases U, V, W around rotary axis 205 in mind.

Other possible elements such as e.g. a heat sink for the current control valves 120, 130 or filtering elements are not depicted in FIG. 2. For the electrical and mechanical connection of the described components, it is preferred to use a circuit board 220, which is preferably a multi-layer board, so that the occurring currents can be handled. In a version as a control device 100 for a starter for a combustion engine or as a combined starter generator, it is possible that currents of up to approx. 800 A can flow at an intermediate circuit voltage of 48 V.

The conducting paths of circuit board 220 should be arranged and dimensioned in such a way that impedances between a half-bridge 115 and the corresponding winding 110 in the induction machine 105 are equal.

REFERENCE SYMBOLS

100 Control system
105 Induction machine
110 Winding
115 Half-bridge
117 connecting line
118 Connecting pin
120 First current control valve
125 High potential
130 second current control valve 135 Low potential
140 Intermediate circuit capacitor
145 Processing device
150 Interface
155 Tachogenerator
160 Current sensor
O Number of pairs of half-bridge 115
P Number of phases U, V, W
N Number of windings 110 of a phase U, V, W
205 Rotary axis
210 Contact element
215 Connection
220 Circuit board

We claim:

1. A method for controlling an induction machine with a plurality of phases,
   wherein each phase of the plurality of phases includes a plurality of parallel windings, and
   wherein each phase is associated with a half-bridge, the method comprising:
   determining a current in a single winding of the plurality of parallel windings, the plurality of windings being associated with a first phase of the plurality of phases;
   determining a phase current on a basis of the current in the single winding; and
   controlling the half-bridge associated with the first phase based on the phase current determined on the basis of the current in the single winding.

2. The method according to claim 1, wherein each phase comprises a number of windings, and wherein the phase current can be determined by multiplying the current by the number of windings.

3. The method according to claim 1, wherein a respective phase current is determined for all but one phase of the plurality of phases on a basis of a respective current in a corresponding plurality of windings.

4. A control device for an induction machine with a plurality of phases, wherein each phase of the plurality of phases comprises a plurality of parallel windings, the control device comprising:
   a half-bridge associated with a first phase of the plurality of phases;
   a processing device to control the half-bridge based on a phase current flowing through the first phase; and
   a current sensor electrically connected to the processing device,
   wherein the current sensor is configured to determine a current that is flowing through a first winding of the plurality of parallel windings of the first phase, and
   wherein the processing device is configured to determine the phase current on a basis of the current in the first winding without measuring the current flowing through at least one winding of the plurality of windings.

5. The control device according to claim 4, wherein the current sensor includes a series resistor that is connected in series with the first winding of the first phase.

6. The control device according to claim 4, wherein the current sensor includes a Hall-effect sensor in a region of an electrical line that is connected to the first winding of the first phase.

7. The control device according to claim 4, wherein the first phase comprises a number of windings, and wherein the phase current can be determined by multiplying the current in the first winding by the number of windings.

8. The control device according to claim 4, wherein a phase current is determined for all but one phase of the plurality of phases based on a respective current in a corresponding plurality of windings.

9. The control device according to claim 4, wherein each winding of the plurality of parallel windings of the first phase is configured such that an equal current flows through each winding.

10. The control device according to claim 4, wherein the half-bridge comprises at least one control valve, and wherein a number of control valves associated with the first phase differs from a number of windings of the first phase.

11. The control device according to claim 4, wherein the control device is configured to be installed concentrically to a rotary axis of the induction machine.

12. The control device according to claim 4, further comprising a tachogenerator electrically connected to the processing device, wherein the tachogenerator is configured to indicate a rotation speed or a rotary position of the induction machine.

13. A control system for controlling an induction machine including a plurality of phases, the control system comprising:
    a plurality of half-bridges, each half-bridge of the plurality of half-bridges being associated with one phase of the plurality of phases of the induction machine;
    a first current sensor configured to determine a first current flowing through a first winding of a first plurality of windings, wherein a first phase of the plurality of phases comprises the first plurality of windings; and
    a control device electrically connected to the first current sensor, wherein the control device is configured to determine a first phase current based only on the first current, and wherein the control device is configured to control a first half-bridge of the plurality of half-bridges, based on the first phase current, the first half-bridge being associated with the first phase.

14. The control system according to claim 13, further comprising:
    a second current sensor configured to determine a second current flowing through a second winding of a second plurality of windings, wherein a second phase of the plurality of phases comprises the second plurality of windings.

15. The control system according to claim 14, wherein the second current sensor is electrically connected to the control device, wherein the control device is configured to determine a second phase current based on the second current, and wherein the control device is configured to control a second half-bridge of the plurality of half-bridges based on the second phase current, the second half-bridge being associated with the second phase.

16. The control system according to claim 15, wherein the control device is configured to determine a third phase current by calculating the sum of the first and second phase currents.

17. The control system of claim 13, wherein the first current sensor comprises a series resistor that is connected in series with one of the windings of the first phase.

18. The control system according to claim 13, wherein the first current sensor includes a Hall-effect sensor in a region of an electrical line that is connected to one of the windings of the first phase.

19. The control system according to claim 13, wherein the first phase comprises N windings, and wherein the first phase current can be determined by multiplying the first current by N.

20. The control device according to claim 13, wherein a phase current is determined for all but one phase of the plurality of phases based on a respective current in a corresponding plurality of windings.

\* \* \* \* \*